United States Patent Office 3,207,806
Patented Sept. 21, 1965

3,207,806
DEHYDROGENATION PROCESS
Laimonis Bajars, Princeton, N.J., assignor to Petro-Tex Chemical Corporation, Houston, Tex., a corporation of Delaware
No Drawing. Filed Nov. 23, 1960, Ser. No. 71,136
15 Claims. (Cl. 260—680)

This invention relates to an improved process for dehydrogenating organic compounds and relates more particularly to the dehydrogenation of organic compounds in the vapor phase at elevated temperatures in the presence of oxygen, at least two halogens and an inorganic catalyst.

It is known that certain organic compounds may be dehydrogenated with oxygen and iodine to form unsaturated derivatives thereof. In many of these processes, large amounts of halogen, as iodine, are required and recovery of the halogen is essential since iodine is an expensive chemical for industrial use. The recovery of iodine, normally in the form of hydrogen iodide, is a complex and expensive process because of its corrosiveness and the large volume of materials that must be handled. Further, the large amounts of iodine which have been used, for example, in the dehydrogenation of butane have not made such processes commercially interesting. For example, U.S. Patent 2,890,253 discloses a process for dehydrogenating a mixture of butane and butene. The data in this patent shows that about 150 weight percent iodine based on the hydrocarbon was required to obtain about a 20 percent yield of butadiene; and to obtain a 50 percent yield of butadiene, about 540 weight percent (more than one mol) of iodine was required per mol of hydrocarbon to be dehydrogenated. Obviously, such disproportionate amounts of expensive reagents, with the iodine recovery problems, has not made such a process commercially attractive.

It is accordingly among the objects of this invention to proxide an improved process where small amounts of halogen are effectively used for the dehydrogenation of organic compounds. It is another object of this invention to increase the efficiency of the halogen used in a process for dehydrogenating organic compounds with oxygen. It is still another object of this invention to provide a method for employing the less expensive halogens, as bromine and chlorine even in small amounts, in such a dehydrogenation process. It is also an object of this invention to provide an improved process for producing butadiene-1,3 and isoprene in high yields with small amounts of halogens by dehydrogenating the equivalent paraffin and olefin hydrocarbons in the presence of oxygen at lower reaction temperatures. Other objects of the invention will be apparent from the description thereof which follows.

I have now found, quite unexpectedly, that the objects of this invention are realized and accomplished by dehydrogenating organic compounds in the vapor phase at elevated temperatures in the presence of oxygen, a mixture of halogens containing at least two different halogens and a hereinafter defined inorganic catalyst. By means of the invention, when two or more halogens are employed in the process of the invention, smaller amounts of either halogen are effectively used as compared to the requirement for the halogens singly, and an unexpected synergistic effect is observed and obtained when two halogens are so employed.

The process of this invention is suitably practiced by passing a mixture of an organic compound containing the

grouping, at least two different halogens or halogen-liberating materials in an amount greater than 0.001 mol of total halogens per mol of organic compound to be dehydrogenated, and at least one-fourth mol of oxygen per mol of organic compound, at a temperature in the range of about 400° C. to about 850° C., and at an organic compound partial pressure equivalent to less than one-half atmosphere at a pressure of one atmosphere, in the presence of a catalyst comprising an inorganic metal compound.

The process of this invention can be applied to a great variety of organic compounds to obtain the corresponding unsaturated derivative thereof. Such compounds normally will contain from 2 to 20 carbon atoms, at least one

grouping, i.e., adjacent carbon atoms each containing at least one hydrogen atom, a boiling point below about 350° C., and such compounds may contain in addition to carbon and hydrogen, oxygen, halogens, nitrogen and sulphur. Among the classes of organic compounds which are dehydrogenated by means of the novel process of this invention are alkanes, alkenes, alkyl halides, ethers, esters, aldehydes, ketones, organic acids, akyl aromatic compounds, alkyl heterocyclic compounds, cyanoalkanes, cycloalkanes and the like. Illustrative applications includes ethylbenzene to styrene, isopropylbenzene to α-methyl styrene, ethylcyclohexane to styrene, cyclohexane to benzene, ethane to ethylene, propane to propylene, propane to propadiene, isobutane to isobutylene, n-butane to butene and butadiene, butene to butadiene, methyl butene to isoprene, propionaldehyde to acrolein, ethyl chloride to vinyl chloride, propionitrile to acrylonitrile, methyl isobutyrate to methyl methacrylate, propionic acid to acrylic acid, ethyl pyridine to vinyl pyridine and the like. Other representative materials which are readily dehydrogenated in the novel process of this invention include ethyl toluene, the alkyl chlorobenzes, ethyl naphthalene, isobutyronitrile, propyl chloride, isobutyl chloride, ethyl fluoride, butyl chloride, the chlorofluoroethanes, methyl ethyl ketone, diethyl ketone, methyl propionate, and the like. This invention is particularly useful in the preparation of vinylidene compounds containing at least one $CH_2=C<$ group, that is a compound possessing at least one group containing a terminal methylene group attached by a double bond to a carbon atom, and 2 to 12 carbon atoms. The invention is further particularly adapted to provide butadiene from butane and butene and isoprene from isopentane and isopentene in high yields and excellent conversion and selectivity.

The halogens employed may be any halogen, preferably iodine, bromine or chlorine, and the form of the halogens may be the halogens themselves or any halogen-containing materials which liberate free halogen under the conditions of the reaction as defined hereinafter. For example, chlorine, bromine and iodine; hydrogen chloride, hydrogen bromide and hydrogen iodide; the alkyl halides such as alkyl iodides and bromides wherein the alkyl groups preferably contain 1 to 6 carbon atoms; ammonium halides including ammonium chloride, ammonium bromide, ammonium iodide and ammonium fluoride; and mixtures of thes may also be employed. The halogens, hydrogen halides, ammonium halides and alkyl halides wherein the alkyl groups contain 1 to 5 carbon atoms, have been found to be particularly useful in the practice of this invention. Any suitable combination of reactants may be used as chlorine and hydrogen bromide; chlorine and bromine; hydrogen chloride and bromine; chlorine and hydrogen iodide, bromine and iodine and the like added together or separately.

The total amount of halogen normally used may be varied quite widely, usually an amount greater than 0.001 mol of halogen per mol of organic compound to be dehydrogenated. More usually, at least about 0.005 mol of total halogens per mol of organic compound will be employed. Large amounts of halogens may be used, as high as one-half to one mol or more per mol of organic compound to be dehydrogenated if desired, but it is one of the unexpected advantages of this invention that only very small amounts of halogens are required, normally less than about 0.2 mol total of halogens, per mol of organic compound to be dehydrogenated. Economic and process considerations will normally dictate the exact amount of halogens to be employed.

The mixtures of halogens will contain at least two halogens as chlorine with iodine, chlorine with bromine, iodine with bromine or mixtures of all three. In mixtures containing chlorine, while chlorine is the least active of the halogens in this type process, chlorine is the least expensive and it is one of the unexpected advantages of this invention that the activity of chlorine is greatly enhanced by the addition of even small amounts of iodine or bromine thereto. In such mixtures, normally chlorine will be the major component present, and more preferably, the halogen mixtures will contain more than 50 percent chlorine and there will be present at least 1 percent of either bromine or iodine. In other mixtures at least 1 percent of one halogen with another will be employed. In all cases the minimum amounts of halogens which will give acceptable yields of desired product will be employed as is demonstrated in the examples and can be readily determined by those skilled in the art. When mixtures are referred to, it will be understood that the halogens may be added separately to the reactor system.

The minimum amount of oxygen employed should be greater than one-fourth mol of oxygen per mol of organic compound to be dehydrogenated, and as much as 6 mols or more of oxygen per mol of organic compound have been used. Excellent yields of the desired unsaturated derivatives have been obtained with amounts of oxygen from 0.4 to about two mols of oxygen per mol of organic compounds, and within the range of about 0.4 to 1.5 mols of oxygen per mol of organic compounds, economic, production and process considerations will dictate more exactly the normal ratio of oxygen to be used. Large amounts of oxygen are used with short contact time and higher dilutions as with steam, for example 30 to 50 mols of steam per mol of organic compound. Use of large amounts of oxygen results in some processing problems, particularly in handling and removing large amounts of nitrogen if air is used, and in keeping the oxygen content of the desired unsaturated product low, so that large amounts of oxygen normally will not be used. Oxygen is supplied to the reaction system as pure oxygen, diluted with inert gases such as helium, carbon dioxide, or as air, and the like. In relation to halogen, the amount of oxygen employed will be greater than 1.25 gram mols of oxygen per gram atom of halogen present in the reaction mixture, usually greater than about two gram mols of oxygen per gram atom of total halogen used.

While the total pressure on systems employing the process of this invention normally will be at or in excess of atmospheric pressure, vacuum may be used. The pressure of the organic compound to be dehydrogenated under reaction conditions will be equivalent to below about 15 inches mercury absolute when the total pressure is one amosphere, and more preferably less than 10 inches mercury absolute to realize the optimum advantages of this invention. Better results and higher yields of desired product are normally obtained when the partial pressure of the organic compound is less than about one-third to one-fiifth of the total pressure when diluents are used. The desired partial pressure is obtained and maintained by techniques known by those skilled in the art including vacuum operations. Steam, nitrogen and air are particularly advantageous to obtain the required low partial pressure of the organic compound in the process. With those materials which may be hydrolyzed as esters and the like, nitrogen, vacuum operations and the like may be used. When steam and oxygen or air are employed, the ratio of steam to organic compound is normally above about two mols of steam per mol of organic compound, within the range of about 5 to 20 mols, although larger amounts of steam as high as 40 mols have been employed. The degree of dilution of the reactants with steam and the like is related to maintaining the partial pressure of the organic compound in the system at below about one-third atmosphere and preferably below 10 inches mercury absolute when the total pressure on the system is one atmosphere, in order to obtain optimum yields of the desired unsaturated derivatives. The lower limit of organic compound partial pressure will be dictated by commercial considerations and normally will be greater than about 0.1 inch of mercury absolute. When the pressure on the reaction system is above one atmosphere, the values for organic compound partial pressure described above will be altered in direct proportion to the increase above one atmosphere, and when the pressure of the reaction system is below one atmosphere the pressure of the organic compound will be maintained below 15 inches mercury absolute.

The reactions involved in the process of this invention are normally exothermic. The temperature of the reaction is from about 400° C. to temperatures as high as 850° C. Optimum temperatures, which are illustrated in the examples, are readily established by those skilled in the art. The optimum temperature may be determined as by thermocouple at the maximum temperature of the reaction. Usually the temperature of reaction will be controlled between about 450° C. and about 750° C.

The flow rates of the gaseous reactants may be varied quite widely and good results have been obtained with organic compound gaseous flow rates ranging from about 0.25 to about 3 liquid volumes of organic compound per volume of reactor packing per hour, the residence or contact time of the reactions in the reaction zone under any given set of reaction conditions depending upon the factors involved in the reaction. Contact times ranging from about 0.01 to about two seconds at about 450° C. to 750° C. have been used, however, a wider range of residence times may be employed but in the case of shorter residence times, lower yields are generally obtained, and in the case of longer residence times, some loss of desired product or starting material from cracking and the like may occur. Optimum contact time is readily established by the man skilled in the art. Normally the shortest contact time consonant with optimum yields and operating conditions is desired and readily determined. Residence time is the calculated dwell time of the reaction mixture in the reaction zone assuming the mols of production mixture are equivalent to the mols of feed mixture.

For conducting the reaction, a variety of reactor types may be employed. Fixed bed reactors may be used and fluid and moving bed systems are advantageously applied to the process of this invention. In any of the reactors suitable means for heat removal may be provided. Tubular reactors of small diameter may be employed and large diameter reactors which are loaded or packed with packing materials are very satisfactory.

The catalyst of this invention will be an inorganic material and normally will be a metal, oxide, salt or hydroxide of Groups Ia, Ib, IIa, IIb, IIIa, IIIb, IVa, IVb, Va, Vb, VIb, VIIb, and VIIIb. While all of these materials are useful in the process of this invention, the oxides represent a more desirable class of materials to be loaded into a reactor and with the less active halogens, the oxides of oxides of Groups IIa, IVb, VIIb, VIIIb and the rare earth group are particularly useful because of their stability, availability and their activity. It will be understood that in order to utilize the minmum amounts of halogens most efficiently in the process of this invention, the more active inorganic catalysts will be employed, for example, cerium oxide, and the like. While the metals may be used, it is believed that under the reaction conditions defined herein the effective surfaces thereof are compounds of the metals as defined. These groups are based on the long form of the Periodic Classification of the Elements as found in Smith's Introductory College Chemistry, 3rd edition, by William F. Ehret (Appleton-Century-Crofts, Inc. 1950).

A particularly useful class of inorganic catalysts are mixtures of inorganic compounds which will comprise at least one alkali or alkaline earth metal oxide or hydroxide or suitable precursor thereof which will provide the equivalent oxide or hydroxide under the process conditions and at least one other inorganic metal or compound thereof. The alkali and alkaline earth metal oxides and hydroxides include lithium hydroxide, sodium oxide, sodium hydroxide, potassium oxide, potassium hydroxide, rubidium oxide, rubidium hydroxide, beryllium oxide, magnesium oxide, magnesium hydroxide, calcium oxide, calcium hydroxide, strontium oxide, strontium hydroxide, barium oxide, barium hydroxide and the like. Precursors of these materials used include, for example, barium sulfide which is converted to the oxide by heating, calcium acetate, calcium oxalate, magnesium acetate, magnesium carbonate, potassium citrate, potassium nitrate and the like which ordinarily decompose and are converted to the oxide on heating at temperatures which would be employed in drying the catalyst pellets or raising a reactor to reaction temperatures. The amount of alkali metal or alkaline earth metal oxide or hydroxide employed with the additional inorganic metal compound may be varied quite widely and while small amounts as low as about one-tenth percent alkali or alkaline earth metal oxide or hydroxide based on the total catalyst have been used, much larger amounts may be employed, in concentrations up to where the alkali metal or alkaline earth metal oxide or hydroxide is the larger constituent in the catalyst composition, as 50 percent since these materials themselves are good catalysts for the dehydrogenation of organic compounds in the presence of oxygen and a halogen, but the use of these larger amounts of activating material normally is not necessary but are included within the scope of this invention. Usually about one to ten percent of the Group Ia or IIa oxide or hydroxide with the remainder the other inorganic metal compound is satisfactory.

A great variety of metal compounds may be used in conjunction with the alkali and alkaline earth metal oxides and hydroxides. The metals themselves may be employed and are included within the scope of this invention. It is assumed that probably in the preparation or use of the catalyst containing an alkali metal oxide or hydroxide or alkaline earth metal oxide or hydroxide and a metal, as iron, the metal would react with such materials and compounds thereof formed so that there may be present the alkali or alkaline earth metal oxide or hydroxide and a compound of the metal, and the metal itself.

Inorganic metal compounds which are useful in the process of this invention include potassium carbonate, magnesium phosphate, magnesium silicate, barium carbonate, barium sulfate, calcium silicate, calcium carbonate, sodium chloride, lanthanum oxide, titanium oxide, zirconium oxide, vanadium pentoxide, tantalum oxide, columbium oxide, chromic oxide, molybdenum oxide, manganese oxide, manganese phosphate, lithium phosphate, iron oxide, iron phosphate, cobalt oxide, iron phosphide, nickel oxide, iron carbonate, iron sulfate, copper oxide, zinc oxide, aluminum oxide, aluminum silicate, tin oxide, lead oxide, antimony oxide, bismuth oxide, bismuth phosphate, bismuth hydroxide, tungstic acid, manganous chloride, zinc sulfate, potassium phosphate, sodium fluoride, calcium nickel phosphate, vanadium oxyphosphate, molybdenum antimonate, molybdenum phosphate, calcium fluoride and the like.

The following combinations have been found to be useful in dehydrogation of hydrocarbons with iodine, bromine or chlorine mixtures; cerium oxide and calcium oxide, cerium oxide and magnesium oxide, cerium oxide with magnesium oxide and calcium oxide, cerium oxide and potassium hydroxide, cerium oxide and sodium hydroxide, cerium oxide and lithium hydroxide, cerium oxide and barium oxide, cerium oxide and barium hydroxide, cerium oxide and strontium hydroxide, zirconium oxide and lithium hydroxide, iron oxide and lithium hydroxide, manganese dioxide and lithium hydroxide, manganese phosphate and lithium hydroxide, titanium oxide and lithium hydroxide, zinc oxide and barium hydroxide, magnesium oxide and calcium hydroxide. Other useful combinations include lithium hydroxide and barium hydroxide, vanadium pentoxide and lithium hydroxide, chromic oxide and barium hydroxide, bismuth oxide and lithium hydroxide, ferric oxide plus lithium hydroxide and barium hydroxide, and the like as disclosed herein. The metal oxides, hydroxides and salts are a useful group of materials since they are inexpensive, are readily formed into pellets or deposited on carriers and may be readily formed in situ. In general a great variety of inorganic metal compounds, particularly inorganic metal salts, oxides and hydroxides are effective when used in conjunction with alkali metal oxides and hydroxides and alkaline earth metal oxides and hydroxides in the process of this invention. Any inorganic compound of the nature described which is effective in and contributes to the defined process, that is, which increases the yield of desired dehydrogenated derivative and/or conversion-selectivity in the defined systems, when present, should be included within the scope of the invention. It is considered that such catalysts which are useful in the process of this invention, present a polar or ionic surface during the course of the reaction.

It will be readily recognized by the man skilled in the art that the most efficient and economical operations under the described reaction conditions will be a factor in the selection of particular catalyst materials and the combinations thereof. The defined catalysts in commercial operations normally will be employed in the form of pellets, tablets, as coatings on carriers or supports and the like, as is well known to those skilled in the art, in both fixed and fluidized beds. The catalysts are readily provided in pellet form and are prepared, for example, by dry mixing the necessary ingredients and tableting, or by preparing a water paste of the necessary ingredients, extruding and cutting into pellets which are then dried. Similarly, salts of the catalyst ingredients may be precipitated as hydroxides or in other forms which are readily converted on heating as to oxides and the precipitated material formed into pellets or tablets. Useful are catalysts deposited on a support where the necessary ingredients are deposited from either water solution or dispersion on a support and thereafter dried.

In the following examples will be found specific embodiments of the invention and details employed in the practice of the invention. V./v./hr. means, with reference to the flow rate of organic compound, liquid volume of organic compound per hour per volume of inorganic catalyst in the reaction zone. Percent conversion represents mols of organic compound consumed per 100 mols of organic compound fed to the reactor and percent selectivity represents the mols of defined unsaturated organic derivative thereof formed per 100 mols of organic compound consumed. These Examples are intended as illustrative only since numerous modifications and variations in accordance with the disclosure herein will be apparent to those skilled in the art.

In Examples 1 through 12 a tubular Vycor[1] reactor equipped with an external electric furnace and filled with Vycor Raschig rings, having deposited thereon hereinafter designated materials, was used. The reaction conditions and the active materials deposited on the Vycor Raschig rings are set forth in the specific examples. The organic compound and oxygen were added at the top of the reactor, the halogens were added to this stream as it entered the reactor and steam was added separately opposite this stream. When hydrogen halides were used they were added to the reactor as aqueous solutions of 37 percent hydrogen chloride, 48 percent hydrogen bromide and 57 percent hydrogen iodide. The Raschig rings were coated with the described materials from water slurries or solutions thereof and dried in a stream of air before use. The results are reported as mol percent conversion, selectivity and yield of desired unsaturated product per pass.

*Example 1*

A Vycor reactor was filled with a catalyst prepared by depositing on 6 mm. Vycor Raschig rings, ceric oxide containing 3 percent calcium oxide and 1 percent magnesium oxide, from a water slurry thereof. A mixture of n-butane, steam, oxygen, hydrogen iodide and hydrogen chloride in a molar ratio of 1 mol of n-butane to 15 mols of steam, 0.85 mol of oxygen, 0.07 mol of $I_2$, and 0.115 mol of $Cl_2$ were added to the reactor at a flow rate of n-butane of one-half liquid v./v./hr. and the reaction was conducted at a temperature of 575° C. Butadiene-1,3 was in the effluent from this reactor in good yield of 54 percent obtained at a conversion of 82 percent and selectivity of 66 percent.

When Example 1 above is repeated using the same reactor set-up and the ceric oxide containing one percent magnesium oxide and three percent calcium oxide on Vycor rings as the reactor packing, acrylonitrile is obtained from propionitrile, styrene from ethylbenzene, isobutylene from isobutane, isoprene from 2-methyl butene-2, vinyl chloride from ethyl chloride, ethylene from ethane, propylene and propadiene from propane, styrene from ethyl cyclohexane, benzene from cyclohexane, methyl isopropenyl ketone from methyl isopropyl ketone, α-methyl styrene from isopropyl benzene, chlorobutadiene from 2-chlorobutene-2, acrolein from propionaldehyde, and acrylic acid from propionic acid, all in good yields.

*Example 2*

6 mm. Vycor Raschig rings were coated with a mixture containing 97.5 weight percent $Fe_3O_4$ and 2.5 weight percent lithium hydroxide from a water slurry thereof and the coated rings were dried and placed in a tubular Vycor reactor. Steam, oxygen and n-butane were added to the reactor in a molar ratio of 15 mols of steam and 1.5 mols of oxygen per mol of n-butane at a flow rate of n-butane of one-half liquid v./v./hr. Halogens were added as the acids thereof as hydrogen iodide, hydrogen bromide and/or hydrogen chloride in amounts equivalent to the molar ratio of molecular halogen set forth in the table below as mols of molecular halogen per mol of n-butane. The reaction was conducted at a temperature of 550° C. and the results in terms of conversion, selectivity and yield of unsaturated hydrocarbon derivative per pass are set forth in the table below.

| Run | Mol $I_2$ | Mol $Br_2$ | Mol $Cl_2$ | Total | Conversion, Percent | Selectivity, Percent | Yield, Percent |
|---|---|---|---|---|---|---|---|
| 1 | | 0.17 | | 0.17 | 78 | 56 | 44 |
| 2 | | | 0.23 | 0.23 | 45 | 71 | 32 |
| 3 | 0.048 | 0.056 | | 0.104 | 79 | 81 | 64 |
| 4 | | 0.056 | 0.076 | 0.132 | 67 | 64 | 43 |
| 5 | 0.048 | | 0.076 | 0.124 | 56 | 72 | 40 |
| 6 | 0.048 | 0.056 | 0.076 | 0.180 | 83 | 84 | 70 |

[1] Vycor is the trade name of Corning Glass Works, Corning, N.Y., and is composed of approximately 96 percent silica with the remainder being essentially $B_2O_3$.

In run 3, in the recovered unsaturated product, the ratio of butadiene to butenes was 1 to 2; in run 2, the ratio of butadiene to butenes was 10 to 1; in run 4, the ratio of butadiene to butenes was 20 to 1; in run 5, the ratio of butadiene to butenes was 15 to 1; and in runs 6 and 7, the ratio of butadiene to butenes was 20 to 1, representing in each case an unexpectedly high yield of butadiene from n-butane. The above data also clearly demonstrate the unexpected synergistic effect obtained when at least two different halogens are employed in the defined reaction conditions.

*Example 3* n-Butane was dehydrogenated over cerium oxide containing two percent calcium oxide and one percent magnesium oxide deposited on 6 mm. Reschig rings under essentially the same reaction conditions as set forth in Example 2 above. The reactants in a molar ratio of 15 mols of steam and 1.5 mols of oxygen per mol of n-butane were fed to the reactor at a flow rate of n-butane at one-half liquid v./v./hr., and the molar amounts of halogens (used as aqueous hydrogen halides) per mol of n-butane are set forth in the table below.

| Run | Mol $I_2$ | Mol $Br_2$ | Mol $Cl_2$ | Total | Conversion, Percent | Selectivity, Percent | Yield, Percent |
|---|---|---|---|---|---|---|---|
| 1 | | 0.084 | 0.115 | 0.20 | 71 | 65 | 46 |
| 2 | 0.072 | | 0.115 | 0.187 | 60 | 77 | 46 |
| 3 | 0.072 | 0.084 | | 0.156 | 82 | 79 | 65 |
| 4 | 0.048 | 0.056 | 0.076 | 0.18 | 82 | 81 | 67 |

*Example 4*

In the following series of runs butene-2 was dehydrogenated to butadiene-1,3 over cerium oxide containing two percent calcium oxide and one percent magesium oxide which was deposited on 6 mm. Vycor Raschig rings. The reactants were added to the reactor in a molar ratio of one mol of butene-2 with 7.5 mols of steam and 1.25 mols of oxygen, and a mixture of chlorine and bromine added as hydrochloric and hydrobromic acids, and the amount of halogens used is set forth in the data table as molecular chlorine and bromine. The reactants were added at a flow rate based on the butene-2 of one liquid v./v./hr. at a reaction temperature of 625° C.

| Run | Mol $Cl_2$ | Mol $Br_2$ | Conversion, Percent | Selectivity, Percent | Yield, Percent |
|---|---|---|---|---|---|
| 1 | 0.06 | 0.002 | 96 | 89 | 86 |
| 2 | 0.04 | 0.001 | 93 | 89 | 83 |
| 3 | 0.02 | 0.002 | 95 | 88 | 84 |
| 4 | 0.02 | | 44 | 72 | 32 |
| 5 | | 0.002 | 52 | 64 | 33 |

The completely unexpected utility of such amounts of chlorine and bromine when used together represents a substantial economic advantage in the process of dehydrogenating organic compounds with oxygen and halogens. As has been discussed, a major problem in the utilization of such process has been in the use of large amounts of expensive halogens and the difficulties involved in the recovery of such halogens, which in a normal process are normally not one hundred percent effective so that continued loss of even small amounts of the expensive iodine is a serious deficiency. Based on the present cost of chlorine, bromine and iodine, less efficient recovery systems could be used economically with chlorine and bromine.

*Example 5*

Butene-2 was dehydrogenated over ceric hydrate deposited on 6 mm. Vycor Raschig rings. This ceric hydrate ($CeO_2XH_2O$) was Lindsay Code No. 201 provided by the Lindsay Chemical Company and a typical analysis of this material on an as received basis is as follows: $CeO_2$—83 percent, $Di_2O_3$ (other rare earth oxides)—2.5 percent, $ThO_2$—0.25 percent, $Fe_2O_3$—0.1 percent, $SO_3$—1 percent, $P_2O_5$—1 percent, $SiO_2$—1 percent, $CaO$—2 percent, $MgO$—1 percent, and the remainder was water. The reactants were added to the reactor in a molar ratio of 1 mol of butene-2, 10 mols of steam, 1 mol of oxygen, 0.02 mol of $Cl_2$ and 0.002 mol of $Br_2$, the chlorine and bromine being added as hydrogen chloride and hydrogen bromine water solutions. The reaction was conducted at 575° C. at a flow rate of butene-2 of 1 liquid v./v./hr. Butadiene-1,3 was obtained in a yield of 85 percent per pass at a conversion of 92 percent and selectivity of 92 percent. These data represent the average of a number of successive runs with the system. When this procedure was repeated exactly with the exception that chlorine gas and bromine dissolved in water rather than hydrogen chloride and hydrogen bromide were used, butadiene-1,3 was obtained in a yield of 84 percent. Use of smaller amounts of chlorine and bromine, as 0.0055 mol of $Cl_2$ and 0.0055 mol of bromine also give good yields of butadiene-1,3 in this system. Another series of runs was made under the same experimental conditions varying the molar ratio of steam to butene from 6 to 20 mols per mol of butene and excellent yields of butadiene-1,3 of 80 percent and higher were obtained over this entire range.

Example 6

Butene-2 was also dehydrogenated with mixtures of chlorine and iodine over cerium oxide containing 2 percent calcium oxide deposited on Vycor Raschig rings. The reactants were added to the reactor in a molar ratio of 1 mol of butene-2, 7.5 mols of steam, 1.25 mols of oxygen and the halogens in the amounts set forth in the table below. The reaction was conducted at a temperature of 625° C., at a flow rate of butene-2 of 1 liquid v./v./hr. The results obtained are set forth in table below.

| Run | Mol $Cl_2$ | Mol $I_2$ | Conversion, Percent | Selectivity, Percent | Yield, Percent |
|---|---|---|---|---|---|
| 1 | 0 | 0 | 30 | 20 | 6 |
| 2 | 0.05 | 0.0005 | 75 | 77 | 58 |
| 3 | 0.04 | 0.001 | 80 | 80 | 63 |
| 4 | 0.02 | 0.002 | 81 | 79 | 64 |
| 5 | 0.02 | | 44 | 72 | 32 |
| 6 | | 0.002 | 48 | 60 | 29 |

It is obvious from these data that excellent yield of butodiene-1,3 from butene is obtained when very small amounts of chlorine and iodine are used together, which amounts of halogen separately produce much inferior results. It has been found, quite unexpectedly, that a mixture of chlorine and bromine are more effective than the equivalent molar amount of a mixture of chlorine and iodine. To demonstrate this, run 4 above was repeated at 610° C. with 0.02 mol of $Cl_2$ and 0.002 mol of $Br_2$, and butadiene-1,3 was obtained in a yield of 82 percent per pass at a conversion of 90 percent and selectivity of 90 percent. This is to be compared to run 4 above where with the equivalent amount of iodine and chlorine, the yield was only 64 percent. Normally in these type reactions, the activity of the halogens is in decending order from iodine to bromine to chlorine to fluorine.

Example 7

Butene was readily dehydrogenated to butadiene-1,3 over the $Fe_3O_4$-LiOH catalyst of Example 2 in the presence of chlorine and bromine added to aqueous solutions of hydrochloric and hydrobromic acids. The molar ratio of reactants from one run was one mol of butene to 2 mols of water, 7.5 mols of air, 0.002 mol of $Br_2$ and 0.06 mol of $Cl_2$. Butadiene-1,3 was obtained in a yield of 69 percent, at a conversion of 86 percent and selectivity of 80 percent at a reaction temperature of 625° C., at a flow rate of butene of one-half liquid v./v./hr.

Example 8

Butadiene-1,3 was obtained in good yield from n-butane by the following procedure. 6 mm. Raschig rings were coated with a mixture of 97.5 percent $Fe_3O_4$ and 2.5 percent LiOH as described above and placed in the Vycor reactor. A mixture of n-butane, air and mixed halogens was added to the reactor at a flow rate of n-butane at one-half liquid v./v./hr. (0.11 liter per minute STP). The molar ratio of reactants was one mol of n-butane to 8 mols of air and 0.076 mol of $Cl_2$, 0.056 mol of $Br_2$ and 0.048 mol of $I_2$ added as a mixture of hydrochloric, hydrobromic and hydriodic acids in water solution. The reaction was conducted at 500° C. and the conversion of n-butane to butadiene per pass was 88 percent at a selectivity of 82 percent and an ultimate yield per pass of 72 mol percent. When this example was repeated with isopentane, similar excellent results in conversion to isoprene were obtained.

Example 9

Isopentane was dehydrogenated to form isoprene in the presence of a mixture of 5 percent $Fe_3O_4$, 93 percent calcium oxide and 2 percent lithium hydroxide coated on 6 mm. Raschig rings. The reaction was conducted at a temperature of 550° C. and the flow rate of isopentane was at the rate of one-half liquid v./v./hr. The reactants were added to the reactor in a molar ratio of one mol of isopentane, 10 mols of steam, 1.6 mols of oxygen, 0.112 mol of $Cl_2$, 0.082 mol of bromine and 0.072 mol of iodine, all added as aqueous solutions of the hydrogen halides. The total yield of desired product was 50 percent at a conversion of 84 percent and selectivity of 60 percent per pass. The dehydrogenated product in the effluent from the reactor contained isoprene and isopentene in a 4 to 1 molar ratio.

Example 10

Butene-2 was dehydrogenated over the ceric hydrate catalyst described in Example 5 at a temperature of about 625° C. and the reactants used had the following molar ratio, 1 mol of butene-2, 7.5 mols of steam, 1.25 mols of oxygen, at a flow rate of butene-2 of 1 liquid v./v./hr. A mixture of bromine and iodine were the halogens employed in this series of runs present in the mol ratios set forth in the table below.

| Run | Mol $Br_2$ | Mol $I_2$ | Conversion, Percent | Selectivity, Percent | Yield, Percent |
|---|---|---|---|---|---|
| 1 | 0.002 | 0.002 | 92 | 87 | 80 |
| 2 | 0.003 | 0.003 | 96 | 87 | 83 |
| 3 | 0.004 | 0.002 | 99 | 89 | 88 |
| 4 | 0.005 | 0.001 | 100 | 88 | 88 |
| 5 | | 0.002 | 48 | 60 | 29 |
| 6 | 0.002 | | 52 | 64 | 33 |

These data clearly demonstrate the synergistic effect obtained from the use of mixed halogens. It is also another demonstration that improved results are obtained in this system when bromine is the larger component of the mixed halogens.

Example 11

A series of $Fe_3O_4$ catalysts were prepared and evaluated by dehydrogenating butene-2 thereover at a reaction temperature set forth in the table below using the following molar ratio of reactants, 1 mol of butene-2, 10 mols of steam, 1 mol of oxygen, 0.003 mols of $Cl_2$ and 0.003 mol of bromine added as aqueous solutions of hydrogen chloride and hydrogen bromide. The inorganic catalysts were deposited on 6 mm. Vycor Raschig rings from aqueous dispersions thereof.

| Run | Surface | Temp., °C. | Conversion, Percent | Selectivity, Percent | Yield, Percent |
|---|---|---|---|---|---|
| 1 | Fe₃O₄ | 625 | 61 | 81 | 50 |
| 2 | Fe₃O₄+3% CaO | 600 | 78 | 88 | 68 |
| 3 | Fe₃O₄+3% K₂O | 590 | 65 | 84 | 55 |

These runs clearly demonstrate that while certain inorganic catalysts as Fe₃O₄ are satisfactory in the process of this invention, the activity in the presence of halogens as chlorine and bromine is greatly enhanced by the addition thereto of small amounts of Group Ia and Group IIa metal oxides.

*Example 12*

Isopentane was dehydrogenated with a mixture of halogens to form isoprene in the presence of a mixture of 70 percent Fe₃O₄ and 30 percent calcium oxide coated on 6 mm. Raschig rings. The reaction was conducted at a temperature of 525° C. and the flow rate of isopentane was at the rate of one-half liquid v./v./hr. The reactants were added to the reactor in a molar ratio of 1 mol of isopentane, 25 mols of steam, 1.5 mols of oxygen, 0.076 mol of I₂, 0.056 mol of Br₂ and 0.048 mol of Cl₂. The halogens were added as aqueous solutions of hydrogen halides. The total yield of dehydrogenated product was 49 percent, at a conversion of 70 percent and selectivity of 70 percent per pass. Another useful catalyst for preparing isoprene from isopentane is a mixture containing 50 percent calcium oxide and 50 percent ferric oxide.

When these examples are repeated with other halogen mixtures, reaction conditions and inorganic catalysts disclosed herein, similar excellent results are obtained.

As is obvious from the above examples and the disclosures herein, the novel process of this invention is applicable to a great variety of dehydrogenatable organic compounds containing 2 to 20 carbon atoms and at least one pair of adjacent carbon atoms bonded together, each carbon atom possessing at least one hydrogen atom including the following: Hydrocarbons including both alkanes and alkenes, especially those containing 2 to 6 carbon atoms; carbocyclic compounds containing 6 to 12 carbon atoms, including both alicyclic compounds and aromatic compounds of the formula

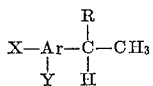

wherein Ar is phenyl or naphthyl, R is hydrogen or methyl and X and Y are hydrogen or alkyl radicals containing 2 to 4 carbon atoms or halogen; alkyl ketones containing 4 to 6 carbon atoms; aliphatic aldehydes containing 2 to 6 carbon atoms; cyanoalkanes containing 2 to 6 carbon atoms; halo-alkanes and halo-alkenes containing 2 to 6 carbon atoms, particularly chloro- and fluoro-alkanes. Such organic compounds may contain in addition to carbon and hydrogen, oxygen, halogen, nitrogen and sulphur.

This invention provides a particularly useful process for providing in high yields vinylidene compounds containing the CH₂=C< group, that is, containing a terminal methylene group attached by a double bond to a carbon atom, from organic compounds containing 2 to 12 carbon atoms and at least one

group wherein adjacent carbon bonds are singly bonded and possess at least one hydrogen each. For example, vinylidene halides; vinylidene cyanide, vinyl esters; acrylic acid and alkyl- and halo-acrylic acids and esters, amides and nitriles; vinyl aromatic compounds, vinyl esters; vinyl halides; vinyl ketones; vinyl heterocyclic compounds including vinyl pyridine and vinyl pyrrolidone; butadiene, chlorobutadiene, isoprene and similar diolefins containing 4 to 6 carbon atoms, olefins containing 2 to 8 carbon atoms, and the like. These vinylidene compounds normally contain from 2 to 12 carbon atoms and are well known as a commercially useful class of materials for making polymers and copolymers therefrom.

I claim:

1. A method for dehydrogenating organic compounds which comprises dehydrogenating in the vapor phase at a temperature from about 400° C. to 850° C. an organic compound selected from the group consisting of alkanes and alkenes containing 2 to 6 carbon atoms, carbocyclic compounds containing 6 to 12 carbon atoms, alkyl ketones containing 4 to 8 carbon atoms, aliphatic acids and aldehydes containing 3 to 6 carbon atoms, cyanolkanes containing 2 to 6 carbon atoms, and haloalkanes and haloalkenes containing 2 to 6 carbon atoms, in the presence of at least ¼ mol of oxygen per mol or organic compound and a mixture of at least two halogens selected from the group consisting of chlorine, bromine, and iodine, said mixture of halogens being present in an amount from at least 0.001 to one mol total per mol of said organic compound, the halogens being present in said mixture of halogens in an amount of at least one percent of each halogen based on the total mixture of halogen, at a pressure of said organic compound equivalent to less than ½ atmosphere at a total pressure of one atmosphere, the said dehydrogenation taking place in the presence of a catalyst comprising as its main active constituent in the catalytic surface a member selected from the group consisting of metals, oxides, salts and hydroxides of metals of Groups Ia, Ib, IIa, IIb IIIa, IIIb, IVa, IVb, Va, Vb, VIb, VIIb, VIIIb, and mixtures thereof.

2. A method for dehydrogenating organic compounds which comprises dehydrogenating in the vapor phase at a temperature from about 400° C. to 850° C. an organic compound selected from the group consisting of alkanes and alkenes containing 2 to 6 carbon atoms, carbocyclic compounds containing 6 to 12 carbon atoms, alkeyl ketones containing 4 to 8 carbon atoms, aliphatic acids and aldehydes containing 3 to 6 carbon atoms, cyanoalkanes containing 2 to 6 carbon atoms, and haloalkanes and haloalkenes containing 2 to 6 carbon atoms, in the presence of at least ¼ mol of oxygen per mol of organic compound and a mixture of at least two halogens selected from the group consisting of chlorine, bromine, and iodine, said mixture of halogens being present in an amount from at least 0.001 to one mol total per mol of said organic compound, the halogens being present in said mixture of halogens in an amount of at least one percent of each halogen based on the total mixture of halogens, at a pressure of said organic compound equivalent to less than about 15 inches mercury absolute when the total pressure is one atmosphere, the amount of said oxygen being greater than 1.25 gram mols of oxygen per gram atom of total halogen, the said dehydrogenation taking place in the presence of a catalyst comprising as its main active constituent in the catalytic surface a member selected from the group consisting of metals, oxides, salts and hydroxides of metals of Groups Ia, Ib, IIa, IIb, IIIa, IIIb, IVa, IVb, Va, Vb, VIb, VIIb, VIIIb, and mixtures thereof.

3. A method for dehydrogenating organic compounds which comprises dehydrogenating in the vapor phase at a temperature from about 400° C. to 850° C. an organic compound selected from the group consisting of alkanes and alkenes containing 2 to 6 carbon atoms, carbocyclic compounds containing 6 to 12 carbon atoms, alkyl ketones containing 4 to 8 carbon atoms, aliphatic acids and aldehydes containing 3 to 6 carbon atoms, cyanoalkanes containing 2 to 6 carbon atoms, and haloalkanes and haloalkenes containing 2 to 6 carbon atoms, in the presence of at least 0.25 mol of oxygen per mol of said organic compound and a mixture of chlorine and bromine, said mixture of chlorine and bromine being present in an amount from at least 0.001 to one mol total per mol of said organic compound, said mixture containing more than 50 percent chlorine and at least one percent bromine based on the total mixture of chlorine and bromine, at a pressure of said organic compound equivalent to less than about 10 inches mercury absolute when the total pressure is one atmosphere, the amount of said oxygen being greater than 1.25 gram mols of oxygen per gram atom of total halogen, the said dehydrogenation taking place in the presence of a catalyst comprising as its main active constituent in the catalytic surface a member selected from the group consisting of metals, oxides, salts and hydroxides of metals of Groups Ia, Ib, IIa, IIb, IIIa, IIIb, IVa, IVb, Va, Vb, VIb, VIIb, VIIIb, and mixtures thereof, and at a contact time from about 0.01 to about 2 seconds.

4. A method for dehydrogenating organic compounds which comprises dehydrogenating in the vapor phase at a temperature from about 400° C. to 850° C. an organic compound selected from the group consisting of alkanes and alkenes containing 2 to 6 carbon atoms, carbocyclic compounds containing 6 to 12 carbon atoms, alkyl ketones containing 4 to 8 carbon atoms, aliphatic acids and aldehydes containing 3 to 6 carbon atoms, cyanoalkanes containing 2 to 6 carbon atoms, and haloalkanes and haloalkenes containing 2 to 6 carbon atoms, in the presence of at least 0.25 mol of oxygen per mol of said organic compound and a mixture of chlorine and iodine, said mixture of chlorine and iodine being present in an amount from at least 0.001 to one mol total per mol of said organic compound, said mixture containing more than 50 percent of chlorine and at least one percent iodine based on the total mixture of chlorine and iodine, at a pressure of said organic compound equivalent to less than about 10 inches mercury absolute when the total pressure is one atmosphere, the amount of said oxygen being greater than 1.25 gram mols of oxygen per gram atom of total halogen, the said dehydrogenation taking place in the presence of a catalyst comprising as its main active constituent in the catalytic surface a member selected from the group metals of Groups Ia, Ib, IIa, IIb, IIIa, IIIb, IVa, IVb, Va, Vb, VIb, VIIb, VIIIb, and mixtures thereof, and at a contact time from about 0.01 to about 2 seconds.

5. A method for dehydrogenating organic compounds which conmprises dehydrogenating in the vapor phase at a temperature from about 400° C. to 850° C. an organic compound selected from the group consisting of alkanes and alkenes containing 2 to 6 carbon atoms, carbocyclic compounds containing 6 to 12 carbon atoms, alkyl ketones containing 4 to 8 carbon atoms, aliphatic acids and aldehydes containing 3 to 6 carbon atoms, cyanoalkanes containing 2 to 6 carbon atoms, and haloalkanes and haloalkenes containing 2 to 6 carbon atoms, in the presence of at least 0.25 mol of oxygen per mol of said organic compound and a mixture of iodine and bromine, said mixture of iodine and bromine being present in an amount from at least 0.001 to one mol total per mol of said organic compound, the bromine being present in said mixture of iodine and bromine as the larger component and iodine being present in an amount of at least one percent based on the total mixture of iodine and bromine, at a pressure of said organic compound equivalent to less than about 10 inches mercury absolute when the total pressure is one atmosphere, the amount of said oxygen being greater than 1.25 gram mols of oxygen per gram atom of total halogen, the said dehydrogenation taking place in the presence of a catalyst comprising as its main constituent in the catalytic surface a member selected from the group consisting of metals, oxides, salts and hydroxides of metals of groups Ia, Ib, IIa, IIb, IIa, IIIb, IVa, IVb, Va, Vb, VIb, VIIb, VIIIb, and mixtures thereof, and at a contact time from about 0.01 to about 2 seconds.

6. A method for dehydrogenating aliphatic hydrocarbons containing 2 to 6 carbon atoms which comprises dehydrogenating in the vapor phase at a temperature from about 400° C. to 850° C. an aliphatic hydrocarbon in the presence of greater than one-fourth mol of oxygen per mol of said aliphatic hydrocarbon and a mixture of at least two halogens selected from the group consisting of chlorine, bromine and iodine, said mixture of halogens being present in an amount from at least 0.001 to one-half mol total per mol of said aliphatic hydrocarbon, the halogens being present in said mixture of halogens in an amount of at least one percent of each halogen based on the total mixture of halogen, at a pressure of said aliphatic hydrocarbon equivalent to less than 10 inches mercury absolute when the total pressure is one atmosphere, the amount of said oxygen being greater than 1.25 gram mols of oxygen per gram atom of total halogen, the said dehydrogenation taking place in the presence of a catalyst comprising as its main active constituent in the catalytic surface a member selected from the group consisting of metals, oxides, salts and hydroxides of metals of Groups Ia, Ib, IIa, IIb, IIIa, IIIb, IVa, IVb, Va, Vb, VIb, VIIb, VIIIb, and mixtures thereof, and at a contact time from about 0.01 to about 2 seconds.

7. A method for preparing butadiene-1,3 which comprises dehydrogenating in the vapor phase at a temperature from about 400° C. to 850° C. a hydrocarbon selected from the group consisting of butene and butane and mixtures thereof in the presence of at least 0.25 mol of oxygen per mol of said hydrocarbon and a mixture of at least two halogens, selected from the group consisting of chlorine, bromine and iodine, said mixture of halogens being present in an amount from at least 0.001 to one mol total per mol of said hydrocarbon, the halogens being present in said mixture of halogens in an amount of at least one percent of each halogen based on the total mixture of halogen, at a pressure of said hydrocarbon equivalent to less than about 10 inches mercury absolute when the total pressure is one atmosphere, the amount of said oxygen being greater than 1.25 gram mols of oxygen per gram atom of total halogen, the said dehydrogenation taking place in the presence of a catalyst comprising as its main active constituent in the catalytic surface a member selected from the group consisting of metals, oxides, salts and hydroxides of metals of Groups Ia, Ib, IIa, IIb, IIIa, IIIb, IVa, IVb, Va, Vb, VIb, VIIb, VIIIb, and mixtures thereof, and at a contact time from about 0.01 to about 2 seconds.

8. A method for dehydrogenating organic compounds which comprises dehydrogenating in the vapor phase at a temperature from about 400° C. to 850° C. an organic compound selected from the group consisting of alkanes and alkenes containing 2 to 6 carbon atoms, carbocyclic compounds containing 6 to 12 carbon atoms, alkyl ketones containing 4 to 8 carbon atoms, aliphatic acids and aldehydes containing 3 to 6 carbon atoms, cyanoalkanes containing 2 to 6 carbon atoms, and haloalkanes and haloalkenes containing 2 to 6 carbon atoms, in the presence of at least 0.25 mol of oxygen per mol of said organic compound and a mixture of chlorine and bromine, said mixture of chlorine and bromine being present in an amount from at least 0.001 to one-half mol total per mol of said organic compound, the chlorine being present in said mixture of chlorine and bromine in an amount of more than 50 percent chlorine based on the total mixture of chlorine and bromine, at a pressure of said organic compound equivalent to less than about 10 inches mercury absolute when the total pressure is one atmosphere, the amount of said oxygen being greater than 1.25 gram mols of oxygen per gram atom of total halogen, the said dehydrogenation taking place in the presence of a catalyst comprising as its main active constituent in the catalytic surface a member selected from the group consisting of metals, oxides, salts and hydroxides of metals of Groups Ia, Ib, IIa, IIb, IIIa, IIIb, IVa, IVb, Va, Vb, VIb, VIIb, VIIIb, and mixtures thereof, and at a contact time from about 0.01 to about 2 seconds.

9. A method for dehydrogenating aliphatic hydrocarbons which comprises dehydrogenating in the vapor phase at a temperature from about 400° C. to 850° C. an aliphatic hydrocarbon in the presence of about 0.4 to about two mols of oxygen per mol of said aliphatic hydrocarbon and a mixture of at least two halogens selected from the group consisting of chlorine, bromine and iodine, said mixture of halogens being present in an amount from at least 0.001 to one mol total per mol of said aliphatic hydrocarbon, the halogens being present in said mixture of halogens in an amount of at least one percent of each halogen based on the total mixture of halogen, at a pressure of said aliphatic hydrocarbon equivalent to less than 10 inches mercury absolute when the total pressure is one atmosphere, the amount of said oxygen being greater than 1.25 gram mols of oxygen per gram atom of total halogen, the said dehydrogenation taking place in the presence of a catalyst comprising as its main active constiuent in the catalytic surface a member selected from the group consisting of metals, oxides, salts and hydroxides of metals of Group Ia, Ib, IIa, IIb, IIIa, IIIb, IVa, IVb, Va, Vb, VIb, VIIb, VIIIb, and mixtures thereof, and at a contact time from about 0.01 to about 2 seconds.

10. A method for dehydrogenating a hydrocarbon selected from the group consisting of butane, butene, methyl butane, methyl butene and mixtures thereof which comprises dehydrogenating in the vapor phase at a temperature from about 400° C. to 850° C. the said hydrocarbon in the presence of about 0.4 to about two mols of oxygen per mol of said hydrocarbon and a mixture of at least two halogens selected from the group consisting of chlorine, bromine, and iodine, said mixture of halogens being present in an amount from at least 0.001 to one mol total per mol of said hydrocarbon, the halogens being present in said mixture of halogens in an amount of at least one percent of each halogen based on the total mixture of halogen, at a pressure of said hydrocarbon equivalent to less than 10 inches mercury absolute when the total pressure is one atmosphere, the amount of said oxygen being greater than 1.25 gram mols of oxygen per gram atom of total halogen, the said dehydrogenation taking place in the presence of a catalyst comprising as its main active constituent in the catalytic surface a member selected from the group consisting of metals, oxides, salts and hydroxides of metals of Groups Ia, Ib, IIa, IIb, III, IIIb, IVa, IVb, Va, Vb, VIb, VIIb, VIIIb, and mixtures thereof, and at a contact time from about 0.01 to about 2 seconds.

11. A method for preparing butadiene-1,3 which comprises dehydrogenating in the vapor phase at a temperature from about 450° C. to 750° C. a hydrocarbon selected from the group consisting of butene and butane and mixtures thereof in the presence of at least 0.25 mol of oxygen per mol of said hydrocarbon and a mixture of at least two halogens, selected from the group consisting of chlorine, bromine and iodine, said mixture of halogens being present in an amount from at least 0.001 to 0.2 mol total per mol of said hydrocarbon, the halogens being present in said mixture of halogens in an amount of at least one percent of each halogen based on the total mixture of halogen and the chlorine being present in an amount of more than 50 percent of the total, at a pressure of said hydrocarbon equivalent to less than about 10 inches mercury absolute when the total pressure is one atmosphere, the amount of said oxygen being greater than 1.25 gram mols of oxygen per gram atom of total halogen, the said dehydrogenation taking place in the presence of a catalyst comprising as its main active constituent in the catalytic surface a member selected from the group consisting of metals, oxides, salts and hydroxides of metals of Groups Ia, Ib, IIa, IIb, IIIa, IIIb, IVa, IVb, Va, Vb, VIb, VIIb, VIIIb, and mixtures thereof, and at a contact time from about 0.01 to about 2 seconds.

12. A method for preparing butadiene-1,3 which comprises dehydrogenating in the vapor phase at a temperature from about 450° C. to 750° C. a hydrocarbon selected from the group consisting of butene and butane and mixtures thereof in the presence of about 0.4 to 1.5 mol of oxygen per mol of said hydrocarbon and steam in an amount above about two mols of steam per mol of said hydrocarbon and a mixture of at least two halogens, selected from the group consisting of chlorine, bromine and iodine, said mixture of halogens being present in an amount from at least 0.005 to 0.2 mol total per mol of said hydrocarbon, the halogens being present in said mixture of halogens in an amount of at least one percent of each halogen based on the total of halogen, at a pressure of said hydrocarbon equivalent to less than about one-fifth of the total pressure, the amount of said oxygen being greater than 1.25 gram mols of oxygen per gram atom of total halogen, the said dehydrogenation taking place in the presence of a catalyst comprising as its main active constituent in the catalytic surface a member selected from the group consisting of metals, oxides, salts and hydroxides of metals of Groups Ia, Ib, IIa, IIb, IIIa, IIIb, IVa, IVb, Va, Vb, VIb, VIIb, VIIIb, and mixtures thereof, and at a contact time from about 0.01 to about 2 seconds.

13. A method for preparing butadiene-1,3 which comprises dehydrogenating in the vapor phase at a temperature from about 450° C to 750° C. a hydrocarbon selected from the group consisting of butene and butane and mixtures thereof in the presence of about 0.4 to 1.5 mol of oxygen per mol of said hydrocarbon and steam within the range of about 5 to 20 mols per mol of said hydrocarbon and a mixture of at least two halogens, selected from the group consisting of chlorine, bromine and iodine, said mixture of halogens being present in an amount from at least 0.005 to 0.2 mol total per mol of said hydrocarbon, the halogens being present in said mixture of halogens in an amount of at least one percent of each halogen based on the total mixture of halogen, at a pressure of said hydrocarbon equivalent to less than about one-fifth of the total pressure, the amount of said oxygen being greater than 1.25 gram mols of oxygen per gram atom of total halogen, the said dehydrogenation taking place in the presence of a catalyst comprising as it main constituent in the catalytic surface a member selected from the group consisting of metals, oxides, salts and hydroxides of metals of Groups Ia, Ib, IIa, IIb, IIIa, IIIb, IVa, IVb, Va, Vb, VIb, VIIb, VIIIb, and mixtures thereof, and at a contact time from about 0.01 to about 2 seconds.

14. A method for dehydrogenating organic compounds which comprises dehydrogenating in the vapor phase at a temperature from about 400° C. to 850° C. an organic compound selected from the group consisting of alkanes and alkenes containing 2 to 6 carbon atoms, carbocyclic compounds containing 6 to 12 carbon atoms, alkyl ketones containing 4 to 8 carbon atoms, aliphatic acids and aldehydes containing 3 to 6 carbon atoms, cyanoalkanes containing 2 to 6 carbon atoms, and haloalkanes and haloalkenes containing 2 to 6 carbon atoms, in the presence of at least ¼ mol of oxygen per mol of organic compound and a mixture of at least two halogens selected from the group consisting of chlorine, bromine, and iodine, said mixture of halogens being present in an amount from at least 0.001 to one mol total per mol of said organic compound, the halogens being present in said mixture of halogens in an amount of at least one percent of each halogen based on the total mixture of halogen, at a pressure of said organic compound equivalent to less than ½ atmosphere at a total pressure of one atmosphere, the said dehydrogenation taking place in the presence of a catalyst comprising a catalytic surface having as its main active constituent an organic iron compound.

15. A method for preparing butadiene-1,3 which comprises dehydrogenating in the vapor phase at a temperature from about 450° C. to 750° C. a hydrocarbon selected from the group consisting of butene and butane and mixtures thereof in the presence of about 0.4 to 1.5 mol of oxygen per mol of said hydrocarbon and steam within the range of about 5 to 20 mols per mol of said hydrocarbon and a mixture of at least two halogens, selected from the group consisting of chlorine, bromine and iodine, said mixture of halogens being present in an amount from at least 0.005 to 0.2 mol total per mol of said hydrocarbon, the halogens being present in said mixture of halogens in an amount of at least one percent of each halogen based on the total mixture of halogen, at a pressure of said hydrocarbon equivalent to less than about one-fifth of the total pressure, the amount of said oxygen being greater than 1.25 gram mols of oxygen per gram atom of total halogen, the said dehydrogenation taking place in the presence of an iron oxide catalyst and at a contact time from about 0.01 to about 2 seconds.

References Cited by the Examiner

UNITED STATES PATENTS

| | | | |
|---|---|---|---|
| 2,370,513 | 2/45 | Amos et al. | 260—680 |
| 2,397,638 | 4/46 | Bell et al. | 260—683 |
| 2,423,494 | 7/47 | Folkins et al. | 260—680 |
| 2,643,269 | 6/53 | Augustine | 260—604 |
| 2,719,171 | 9/55 | Kalb | 260—680 |
| 2,921,101 | 1/60 | Magovern | 260—680 |

ALPHONSO D. SULLIVAN, *Primary Examiner.*

PAUL M. COUGHLAN, *Examiner.*